Oct. 12, 1926.  
G. W. RUSSELL  
CHUCK  
Filed Nov. 5, 1924  
1,602,708  
2 Sheets-Sheet 1
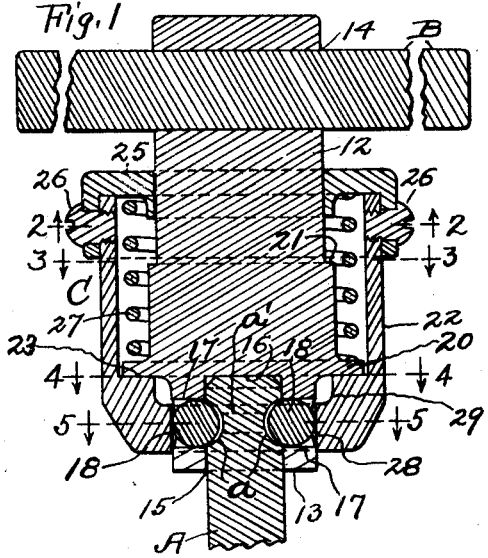
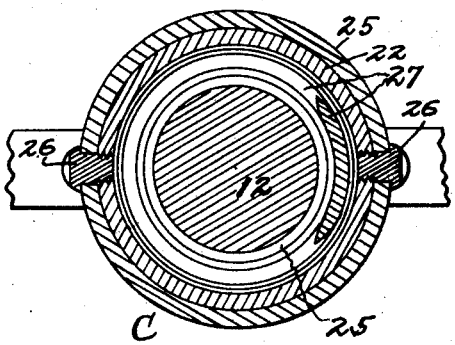
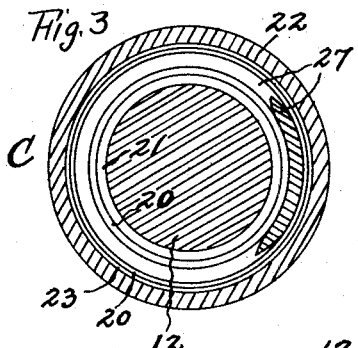
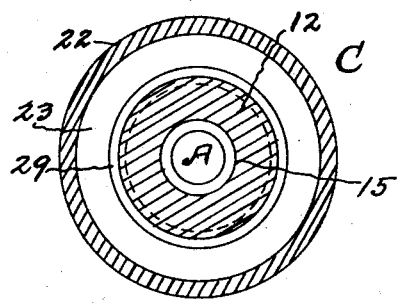
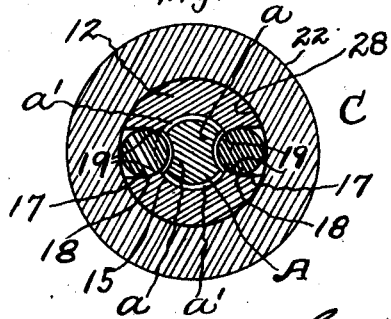
Inventor:  
George W. Russell  
By *[signature]*  
his Attorney.

Oct. 12, 1926.
G. W. RUSSELL
CHUCK
Filed Nov. 5, 1924  2 Sheets-Sheet 2
1,602,708
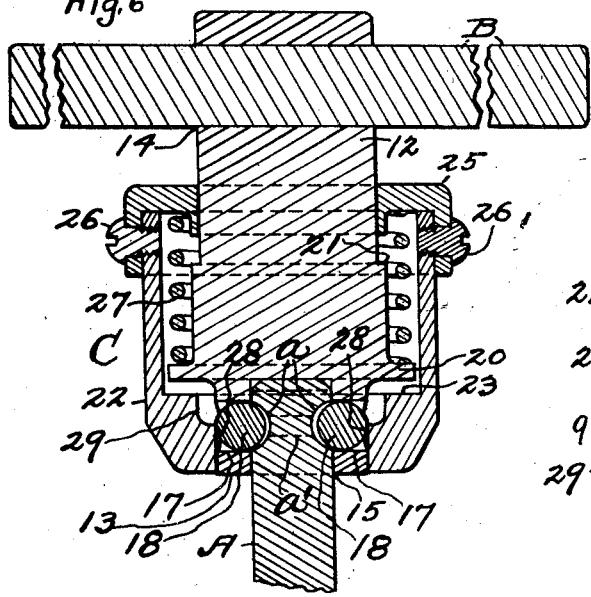
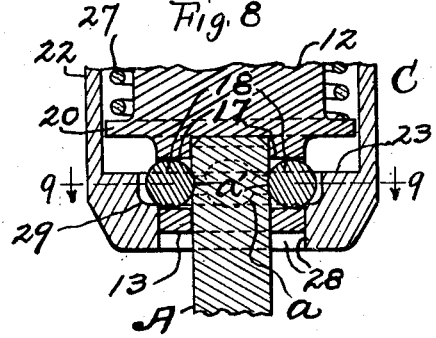
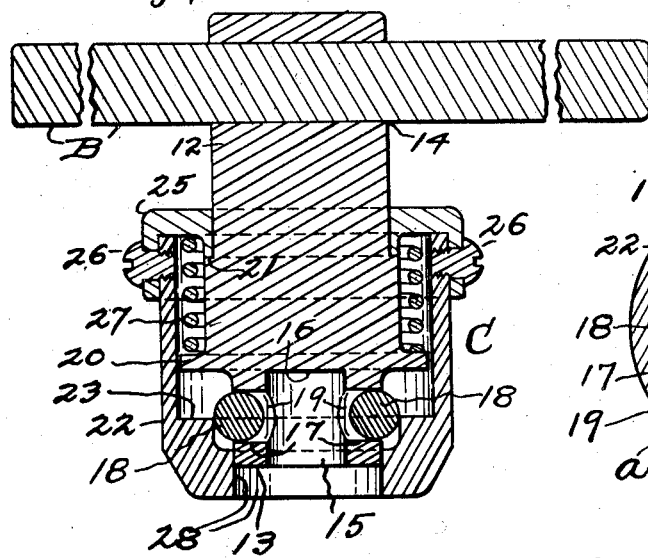
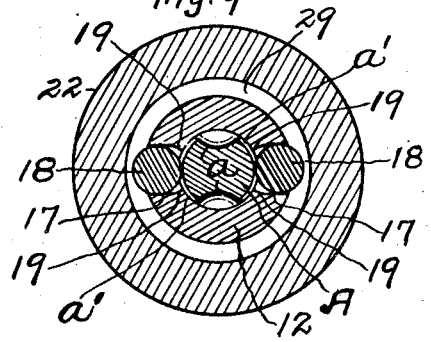
Inventor:
George W. Russell
By his Attorney.

Patented Oct. 12, 1926.

1,602,708

UNITED STATES PATENT OFFICE.

GEORGE W. RUSSELL, OF CLEVELAND, OHIO.

CHUCK.

Application filed November 5, 1924. Serial No. 747,914.

This invention relates to improvements in chucks, and pertains more especially to a chuck adapted to be rotated and comprising balls adapted to be employed in establishing operative connection between a tool and the chuck.

One object of this invention is to produce an efficient and reliable chuck, and to enable a tool to be readily attached to and removed from the chuck.

Another object is to render my improved chuck simple and durable in construction, and to facilitate the assemblage of the component parts of the chuck.

Another object is to produce a chuck of the character indicated which comprises simple, efficient and reliable means for preventing accidental separation of the hereinbefore mentioned balls from the body of the chuck.

With these objects in view, and to attain other objects hereinafter appearing, this invention consists in certain features of construction, and combinations and relative arrangements of parts, hereinafter described in this specification, pointed out in the claims, and illustrated in the accompanying drawings.

In said drawings, Figure 1 is a central vertical section of an upright chuck embodying my invention and shows the chuck as applied to the shank of a tool adapted to be rotated by and during rotation of the chuck. Fig. 2 is a horizontal section taken along line 2—2 in Fig. 1, looking upwardly. Figs. 3, 4 and 5 are horizontal sections taken along line 3—3, line 4—4 and line 5—5, respectively in Fig. 1, looking downwardly. Figs. 6 and 7 are vertical sections illustrative of the required manipulation of the chuck for releasing a tool from the chuck. Fig. 8 is a vertical section illustrative of a position that the tool may assume in relation to the chuck in attaching the tool to the holder. Fig. 9 is a transverse section taken along line 9—9 in Fig. 8. Portions are broken away in Figs. 1, 2, 6, 7 and 8 to reduce the size of the drawings.

In Figs. 1, 4 and 5 of said drawings, A indicates the shank of a tool such, for instance, as a tap, drill or reamer, and said shank is shown operatively connected with a chuck embodying my invention. Said chuck is shown as comprising a substantially vertical rigid metal body 12 preferably composed of steel and externally circular in cross-section. As shown in Fig. 1, said body 12 has an annular socket-forming lower end portion 13 which is concentric in relation to the axis of the body, and said body also has a hole 14 formed at the opposite end portion of the body and extending transversely of and through the body. The hole 14 is engaged by a rigid member B employed in rotating the body 12 and extending through said hole and laterally of said body, and said member B is adapted to be actuated by hand or operatively connected with a power-driven spindle not shown. The interior chamber 15 of the lower end portion or socket 13 of the body 12 is circular in cross-section and has a substantially horizontal end wall 16, and in Fig. 1 the hereinbefore mentioned tool-shank A is shown occupying said chamber and abutting against said wall, and said shank is circular in end elevation.

The socket 13 (see Figs. 1 and 5) has two substantially corresponding lateral holes 17 formed at opposite sides respectively and therefore spaced circumferentially of the socket, and said holes extend radially of the socket from the interior to the circumference of the socket. Preferably said holes 17 are in line endwise and formed centrally between the inner and outer extremities of the chamber 15, and two metal balls 18, preferably of steel, engage opposite holes 17 respectively.

As shown in Figs. 1 and 5, the tool-shank A has two substantially corresponding segmentally spherical external pockets a formed at opposite sides respectively of the shank and adjacent and registering with opposite holes 17 respectively, and each ball 18 is largely contained within the hole 17 engaged by said ball and normally protrudes at and from the inner end of said hole into the adjacent pocket a and therefore participates in establishing operative connection between said shank and the body 12.

The inner portion of each hole 17 is somewhat reduced in width toward the inner extremity of the hole, as shown in Fig. 5, as required to form two shoulders 19 arranged at the inner end of opposite sides respectively of said hole and facing in the direction of the outer end of said hole, and said shoulders are therefore arranged to prevent movement of the ball engaging said hole wholly into the chamber 15 when said chamber is not occupied by the shank of a tool.

The body 12 is provided, at the upper end of the socket 13, with a substantially horizontal annular external flange 20 and is reduced diametrically at a point spaced upwardly from said flange to form an upwardly facing annular external shoulder 21, and it will be observed that the holes 17 in the socket 13 are spaced downwardly from said flange.

My improved chuck (see Figs. 1, 2, 3, 4 and 5) comprises a sleeve C comprising a tubular metal section 22 which extends endwise of and surrounds the body 12 at opposite sides of and surrounds the flange 20. The lower end portion of the section 22 of the sleeve C extends under the flange 20 and has a substantially horizontal annular surface 23 abutting against the under side of said flange in the normal position of the sleeve in relation to the body 12 and forming an upwardly facing annular shoulder internally of said sleeve-section. The sleeve C also comprises an annular upper end member 25 which consists of an annular metal section arranged opposite the shoulder 21 of the body 12 and slidably embracing and having bearing on said body. The end member 25 of the sleeve is removably secured, preferably by screws 26, to the sleeve-section 22. By the construction just described obviously the sleeve-member 25 is arranged opposite the flange 20 and spaced from said flange in the direction in which the shoulder 21 of the body 12 faces so as to permit the interposition and confinement of a coiled spring 27 endwise between said flange and said sleeve-member.

The spring 27 constitutes resilient means acting to retain the sleeve C in normal relation to the body 12 and surrounds and extends endwise of said body between the flange 20 and the end member 25 of the sleeve and is surrounded by the sleeve-section 22.

The lower end portion of the sleeve-section 22 extends around the socket 13 and has an annular internal surface 28 extending downwardly from an annular internal recess 29 which is formed at the shoulder or surface 23 of said portion of said sleeve-section. The surface 29 of the sleeve is arranged to hold the balls 18 in their inner and operative position in the normal position of the sleeve in relation to the body 12, as shown in Fig. 1, and the recess 29 is arranged to permit movement of said balls outwardly into an inoperative position after the required relative endwise movement of the sleeve and body, as shown in Fig. 7, and the upper end member 25 of the sleeve abuts against the upwardly facing shoulder 21 of the body after said relative movement of the body and sleeve. The relative arrangement of the parts is preferably such that when said end member 25 of the sleeve abuts against the shoulder 21, as shown in Fig. 7, the shoulder or surface 23 of the sleeve is substantially in the same plane transversely of the chuck with the axes of the balls 18.

By the hereinbefore described construction and relative arrangement of parts it will be observed that, in the normal position of the spring-surrounding sleeve C in relation to the chuck-body 12 the balls 18 are maintained in an operative position in which said balls, as shown in Figs. 1 and 5, are adapted to be employed in establishing operative connection between said body and the shank A of a tool to be rotated by and during the rotation of said body in any approved manner; that the spring 27 acts to retain the sleeve in position with its shoulder 23 abutting against the flange 20 and therefore in normal relation to said body; that the sleeve and chuck-body normally have relative endwise movement against the action of the spring to the extent required to shift the sleeve out of normal relation to said body into the position shown in Fig. 7 in relation to said body, and that relative endwise movement of the sleeve and chuck-body can be effected by shifting said body in any approved manner in the direction in which the shoulder 21 of the sleeve faces while holding the sleeve in any approved manner against movement with the body, or by shifting the sleeve in any approved manner in the opposite direction while holding the body against movement with the sleeve in any approved manner, or by said shifting of the sleeve and said shifting of the chuck-body simultaneously in any approved manner. It will also be observed that during relative endwise movement of the sleeve and chuck-body to bring the sleeve into the position shown in Fig. 7 in relation to said body from its normal relation to said body the balls 18 are rendered free to begin outward movement into the recess 29 in the sleeve when the bottom of said recess 29 has been brought into the same plane, transversely of the chuck, with the axes of said balls as shown in Fig. 6; that the tool shown operatively connected with the chuck in Fig. 1 has been rendered free to permit commencement of the withdrawal of the tool from the socket 13 of the chuck-body when the sleeve has been shifted in relation to said body as far as shown in Fig. 6 during said relative movement of the sleeve and body, and that during said withdrawal of the tool the shank A is adapted to actuate the balls 18 outwardly out of the pockets a in said shank and partially into the recess 29 in the sleeve during said relative movement of the sleeve and chuck-body, and the chuck is illustrated in Fig. 7 without any tool in operative connection with the chuck. The relative arrangement of the parts is furthermore such that the outer surrounding wall of the recess 29 is arranged to limit outward movement of the balls 18 only to such an extent that the axis of each ball 18, in the outer position of the ball as shown in Fig. 7, shall not be outside of the hole 17 engaged by said ball.

The two pockets *a* in the tool-shank A are shown formed at opposite ends respectively of and communicate with and extend equidistantly above and below two substantially corresponding and diametrically opposite circumferential grooves *a'* which are concentric in relation to the shank and arranged to extend opposite and transversely and centrally of the inner end of opposite holes 17 respectively in the socket 13 of the chuck-body when said shank is inserted into said socket with said pockets in non-registering relation to said holes, as shown in Figs. 8 and 9. Obviously, therefore, were the shank A, when the sleeve and chuck-body are held in the relative position shown in Fig. 7, introduced into the socket 13 with the pockets *a* in said non-registering relation to the holes 17, each ball 18, by permitting and during relative endwise movement of the sleeve and chuck-body by the spring from the relative position shown in Fig. 7 into the relation shown in Fig. 8, will be engaged by the bottom of the recess 29 in the sleeve and actuated inwardly by said bottom into engagement with the adjacent groove *a'* in said shank, as shown in Figs. 8 and 9, so as to cause said shank to be held to the chuck-body preliminary to the rotation of said body to the extent required to bring the balls 18 into registering relation to the aforesaid pockets as required to permit the sleeve to be shifted in relation to said body by the spring from the position shown in Fig. 8 into its normal position shown in Fig. 1.

What I claim is:—

1. A chuck comprising an upright body having a circumferential flange and reduced diametrically at a point spaced upwardly from said flange to form an upwardly facing circumferential shoulder and comprising a socket which is concentric in relation to the axis of the body and extends below said flange and has lateral holes spaced downwardly from said flange and extending from the interior to the circumference of the socket, balls engaging said holes and engageable with pockets in the shank of a tool insertable into the socket, a sleeve movable endwise of the body and having an upper end member extending opposite the aforesaid shoulder and spaced upwardly from said shoulder in the normal position of the sleeve in relation to the body, the lower end portion of the sleeve having a surface which abuts against the under side of the aforesaid flange in said position of the sleeve and also having an annular internal recess at said surface and an annular internal surface which extends downwardly from said recess and is arranged to hold the balls in their inner and operative position in said position of the sleeve, and means acting to retain the sleeve in said position, said recess being arranged to permit movement of the balls outwardly into an inoperative position after the required relative endwise movement of the sleeve and body, and the aforesaid upper end member of the sleeve abutting against the aforesaid shoulder after said relative movement of the body and sleeve.

2. The combination, with a tool-shank which is circular in end view and has two diametrically opposite circumferential grooves arranged concentrically in relation to the axis of the shank and also has two external pockets formed at opposite ends respectively of and communicating with and extending above and below the grooves, of a chuck-body comprising a socket which is engaged by said shank and has two holes extending from the interior to the circumference of the socket and adapted to register one with each of said pockets, two balls engaging one with each of said holes, a sleeve slidable endwise of said body and having a portion which, in the normal position of the sleeve in relation to the body, is arranged to hold the balls in engagement with the pockets, and means acting to retain the sleeve in said position, the aforesaid grooves being arranged to be engaged by the balls when the shank, while engaging the socket, is in position with its pockets out of registering relation to the aforesaid holes, and the sleeve being internally contoured as required to hold the balls in engagement with said grooves when the grooves are engaged by the balls as well as to permit movement of the balls outwardly out of engagement with the pockets after the required relative endwise movement of the sleeve and body.

In testimony whereof, I sign the foregoing specification.

GEORGE W. RUSSELL.